United States Patent [19]

Herzog

[11] Patent Number: 5,335,782

[45] Date of Patent: Aug. 9, 1994

[54] CONVEYOR POST RAIL CLAMP

[76] Inventor: Kenneth J. Herzog, 200 Mill Rd., Riverhead, N.Y. 11901

[21] Appl. No.: 60,651

[22] Filed: May 13, 1993

[51] Int. Cl.⁵ .............................................. B65G 21/20
[52] U.S. Cl. .................................................. 198/836.3
[58] Field of Search ...................................... 198/836.3

[56] References Cited

U.S. PATENT DOCUMENTS

| | | | |
|---|---|---|---|
| 3,647,051 | 3/1972 | Didas | 198/836.3 |
| 4,225,035 | 9/1980 | Mohney et al. | 198/836.3 |
| 4,502,594 | 3/1985 | Sijbrandij | 198/836.3 |

*Primary Examiner*—Joseph E. Valenza

[57] ABSTRACT

A conveyor post clamp for a conveyor rail on a packaging and bottling conveyor is provided and contains a structure that can quickly connect to a conveyor belt frame and the conveyor rail and be adjustable with respect to the height and depth thereof.

3 Claims, 1 Drawing Sheet

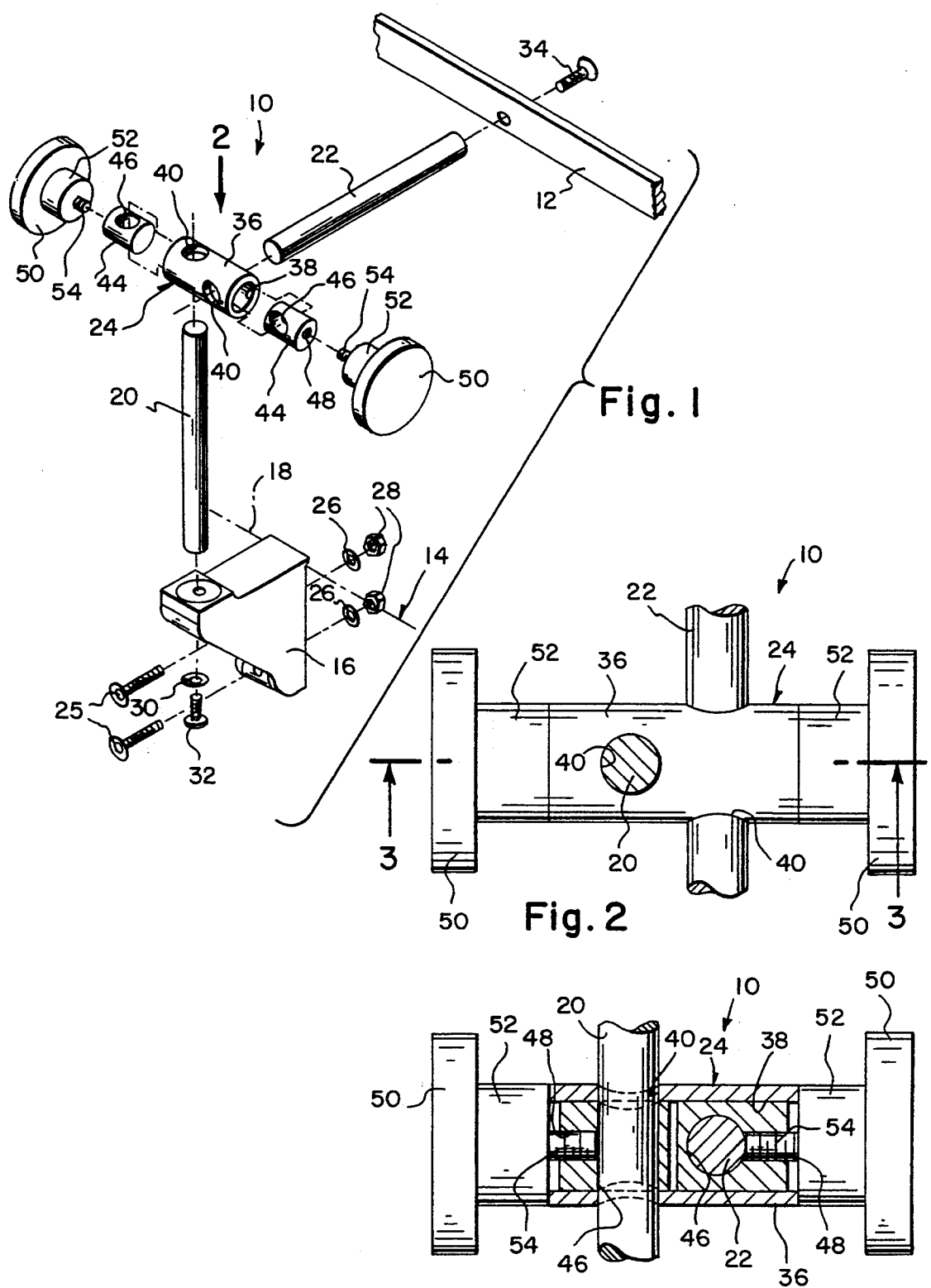

CONVEYOR POST RAIL CLAMP

BACKGROUND OF THE INVENTION

The instant invention relates generally to mounting brackets and more specifically it relates to conveyor post clamp, which provides a structure that quickly connects and disconnects from a conveyor rail on a packaging and bottling conveyor.

There are available various conventional mounting brackets which do not provide the novel improvements of the invention herein disclosed.

SUMMARY OF THE INVENTION

A primary object of the present invention is to provide a conveyor post clamp that will overcome the shortcomings of the prior art devices.

Another object is to provide a conveyor post clamp that can quickly connect to and disconnect from a conveyor rail on a conveyor.

An additional object is to provide a conveyor post clamp that is adjustable both in its height and in its depth, with respect to the conveyor rail on the conveyor.

A further object is to provide a conveyor post clamp that is simple and easy to use.

A still further object is to provide a conveyor post clamp that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an exploded perspective view of the instant invention.

FIG. 2 is an enlarged assembled top view with parts broken away taken in direction of arrow 2 in FIG. 1.

FIG. 3 is a cross sectional view taken along line 3-3 in FIG. 2, showing the internal locking structure therein.

DETAILED DESCRIPTION OF THE PREFERRED EMBODIMENTS

Turning now descriptively to the drawings, in which similar reference characters denote similar elements throughout the several views, FIGS. 1 through 3 illustrate a conveyor post clamp 10 for a conveyor rail 12 on a bottle capping machine 14, that is shown in U.S. Pat. No. 3,905,177, which is incorporated herein by reference. The conveyor post clamp 10 contains a base 16 that is mounted to a conveyor belt frame 18 on the conveyor 14. A pair of studs 20 and 22 are also provided. The first stud 20 is mounted in a vertical position on the base 16. The second stud 22 is mounted in a horizontal position on the conveyor rail 12. A structure 24 is for securing in an adjustable manner the distal free ends of the studs 20 and 22 transversely together. Conveyor rail 12 could also be a sensor switch, reflector or other two directional adjustable unit.

A pair of button head bolts 25, each extend horizontally through a front portion of the base 16 and the conveyor belt frame 18. A lock washer 26, fits onto one end of each button head bolt 25. A nut 28 is threaded onto one end of each button head bolt 25.

A lock washer 30 fits onto an end of a button head bolt 32. The end of the button head bolt 32 can extend vertically and upwardly through an extended portion of the base 16 and thread into a lower end of the first stud 20. An end of a flat head bolt 34 can extend horizontally through the conveyor rail 12 and thread into an end of the second stud 22.

The adjustable securing structure 2 includes a cylindrical cross support 36, having a central bore 38 therethrough with a pair of spaced apart transverse apertures 40 intersecting through the central bore 38. a pair of cylindrical locking sleeves 44, each have a transverse aperture 46 therethrough and a recessed threaded hole 48 in one end. A pair of knobs 50, each have a collar 52 with a threaded shank 54 extending centrally from one side. Each sleeve 44 can fit into each end of the central bore 38 of the cross support 36, with the transverse aperture 46 in each sleeve 44 in alignment with each transverse aperture 40 in the cross support 36, to allow the distal free ends of the studs 20, 22 to extend therethrough. Each threaded shank 54 is threaded into each recessed threaded hole 48 in each sleeve 44, until each collar 52 bears against one end of said cross support 36 to pull the sleeves 44, making the transverse aperture 46 in each sleeve 44 out of alignment to bind against each stud 20, 22.

Operation Of The Invention

To use the conveyor post clamp 10, simply mount the base 16 to the conveyor belt frame 18 with the button head bolts 25, lock washers 26 and nuts 28. Then mount the first stud 20 to the base with button head bolt 32 and lock washer 30. The flat head bolt 34 mounts the second stud 22 to the conveyor rail 12. The securing structure 24 can then be applied in an adjustable manner to the distal free ends of the studs 20 and 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A conveyor post clamp for a conveyor rail on a packaging and bottling conveyor which comprises:
   a) a base;
   b) means for mounting said base to a conveyor belt frame on said conveyor;
   c) a pair of studs;
   d) means for mounting said first stud in a vertical position on said base;
   e) means for mounting said second stud in a horizontal position on the conveyor rail;
   f) means for securing in an adjustable manner the distal free ends of said studs transversely together; wherein said first mounting means includes:
   g) a pair of button head bolts, each to extend horizontally through a front portion of said base and the conveyor belt frame;
   h) a pair of lock washers, each to fit into one end of one said button head bolt;
   i) a pair of nuts, each to thread onto one end of one said button head bolt; wherein said second mounting means includes:

j) a button head bolt; and k) a lock washer to fit onto an end of said button head bolt, so that the end can extend vertically and upwardly through an extended portion of said base and thread into a lower end of said first stud.

2. A conveyor post clamp as recited in claim 1; wherein said third mounting means includes a flat head bolt, so that an end of said flat head bolt can extend horizontally through the conveyor rail and thread into an end of said second stud.

3. A conveyor post clamp as recited in claim 2; wherein said adjustable securing means includes:

a) a cylindrical cross support having a central bore therethrough with a pair of spaced apart transverse apertures intersecting through the central bore;

b) a pair of cylindrical locking sleeves, each having a transverse aperture therethrough and a recessed threaded hole in one end; and c) a pair of knobs, each having a collar with a threaded shank extending centrally from one side, so that each said sleeve can fit into each end of the central bore of said cross support with the transverse aperture in each said sleeve in alignment with each transverse aperture in said cross support, to allow the distal free ends of said studs to extend therethrough and each threaded shank threaded into each recessed threaded hole in each said sleeve, until each collar bears against one end of said cross support to pull said sleeves, making the transverse aperture in each said sleeve out of alignment to bind against each said stud.

* * * * *